Oct. 28, 1952   R. D. GARDNER, JR., ET AL   2,615,659
AIRCRAFT ENCLOSURE JETTISON SYSTEM
Filed March 26, 1949   4 Sheets-Sheet 1

INVENTORS:
RAY D. GARDNER, Jr.
FRED C. BRETCHER
BY
Herbert E. Metcalf
Attorney

INVENTORS:
RAY D. GARDNER, JR.
FRED C. BRETCHER
BY Herbert E. Metcalf
Attorney

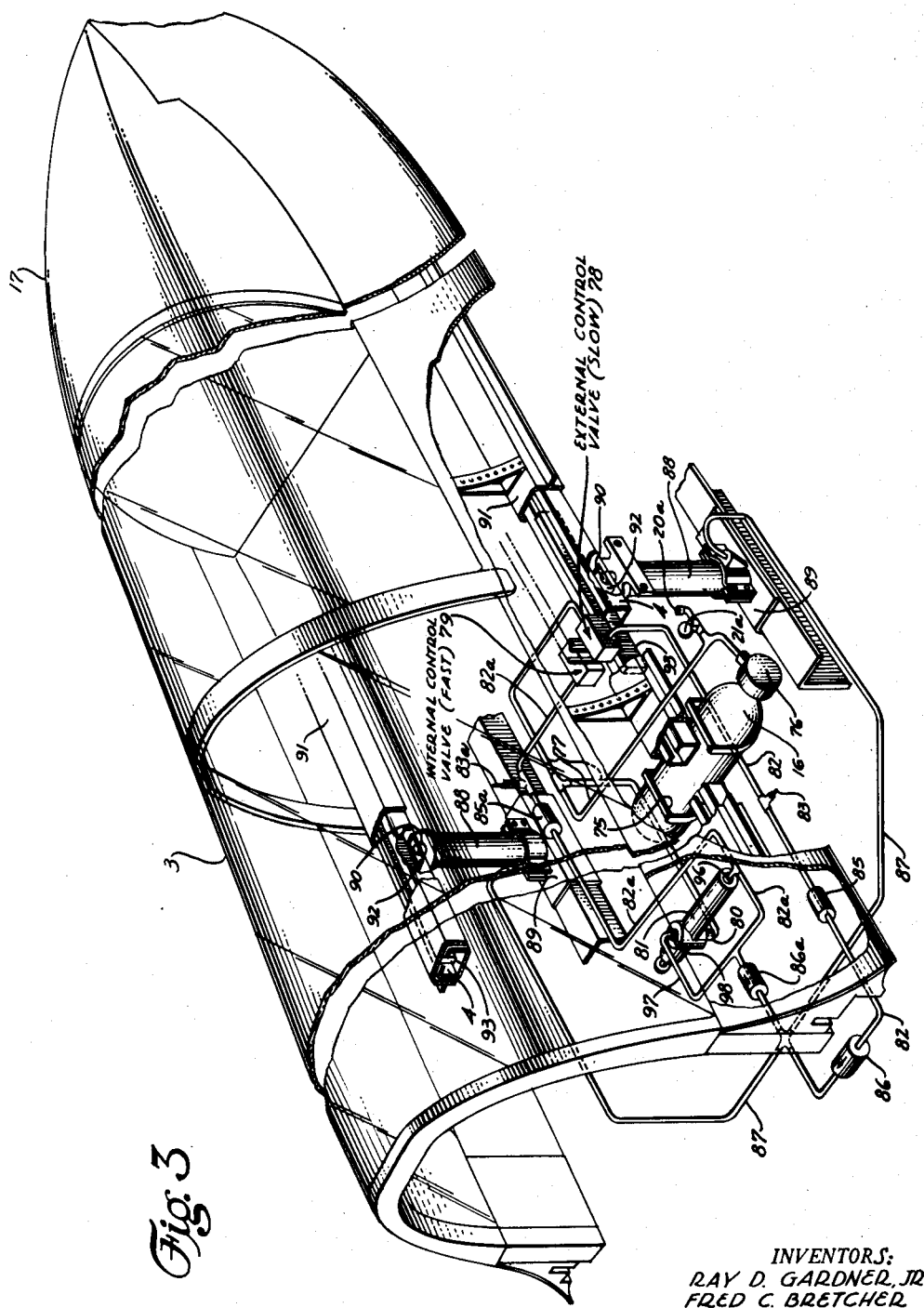

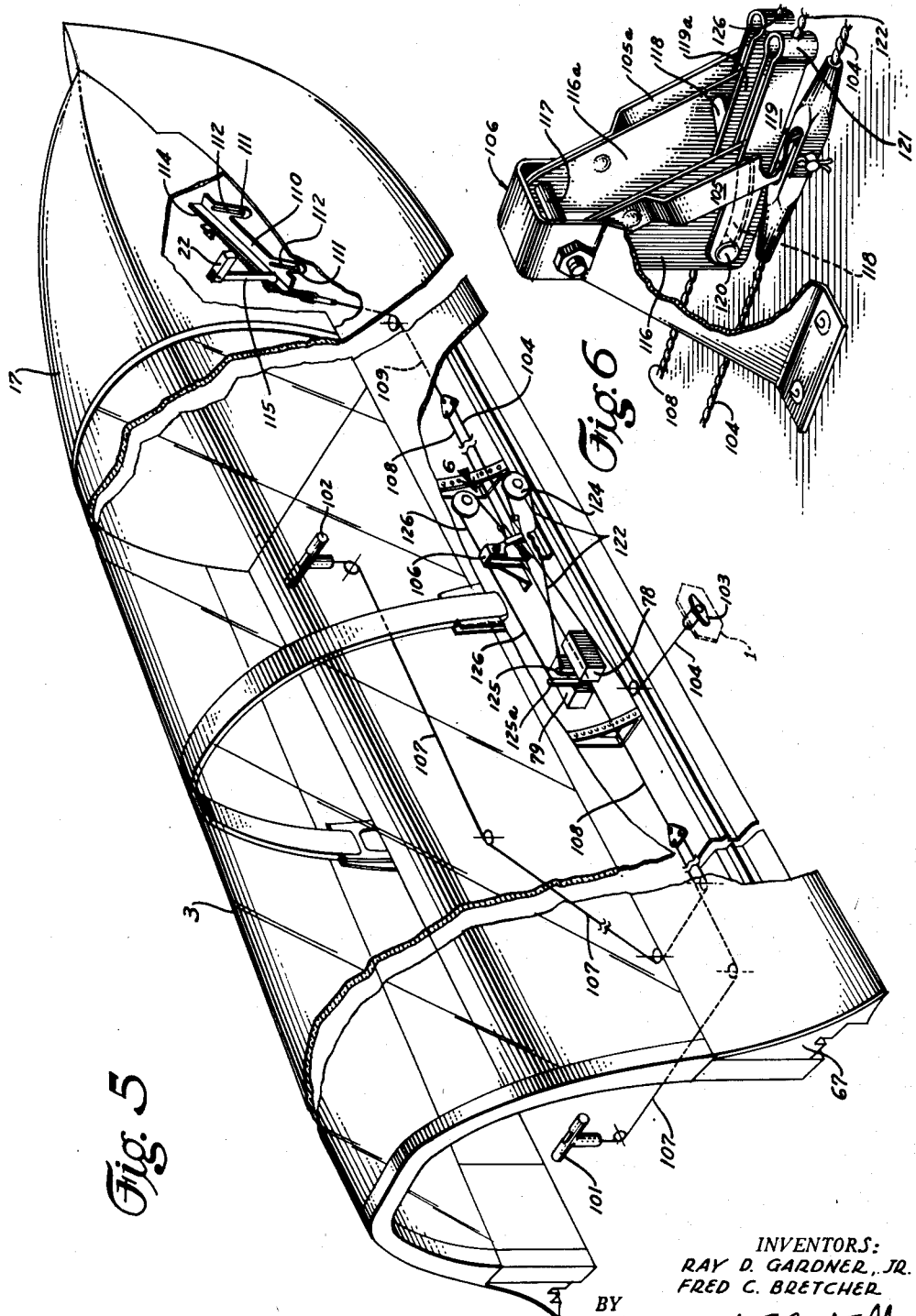

Patented Oct. 28, 1952

2,615,659

UNITED STATES PATENT OFFICE 2,615,659

AIRCRAFT ENCLOSURE JETTISON SYSTEM

Ray D. Gardner, Jr., and Fred C. Bretcher, Los Angeles, Calif., assignors to Northrop Aircraft, Inc., Hawthorne, Calif., a corporation of California Application March 26, 1949, Serial No. 83,539

20 Claims. (Cl. 244—121)

This invention relates to airplane cockpit enclosures, and more particularly, to a means and method of jettisoning such enclosures in flight and releasing them in emergency conditions on the ground.

In airplanes having only a one or two man capacity, where entrance to and exit from the cockpit is possible only from the top, a transparent enclosure or canopy is usually provided to close the cockpit during flight. These enclosures may be disengaged from the inside to allow emergency exit in flight, as well as enabling normal opening on the ground.

When the airplane is traveling at the high speeds now attainable, the jettisoning of such enclosures is undesirably dangerous, since the path of the enclosure after its release is unpredictable. It may be twisted sideways before being blown clear, or dip downwardly immediately after release, thus endangering the pilots and also very likely striking the tail control surfaces and throwing the airplane out of control before the crew can bail out. Wind tunnel tests substantiate the occurrence of these effects. The problem is especially critical when the size of the enclosure gives it a very heavy weight.

It is an object of the present invention to provide a cockpit enclosure which can be positively thrown upwardly, clear of the crew's stations and airplane tail section, when jettisoned in an emergency.

Conditions may also occur which would render desirable the emergency opening of the enclosure on the ground and from outside the airplane as well as from within. In the case of power-operated enclosures in particular, the normal opening mechanism may be inoperative, or the structure may be damaged so as to jam the enclosure in the closed position against manual efforts. In these instances, the use of the high power jettison equipment used to throw the enclosure free in flight would not be advisable because of unnecessary danger to the outside operator and other persons or objects in the vicinity.

Another object of this invention, therefore, is to provide a cockpit enclosure which can be rapidly thrown free of the airplane, and which is provided with emergency external control means to positively lift it at a controlled, slow rate.

Furthermore, in some airplanes, while flying slowly, or at certain angles of attack, release of the cockpit canopy may not cause it to be removed at all. It is another object of this invention to provide a means of jettisoning an enclosure which will function positively at all airplane speeds, attitudes, and conditions of motion which might be obtained in an emergency.

Still another object is to provide a cockpit enclosure jettison system in which but one pilot operation is necessary to unlock all enclosure latches and to actuate a jettison mechanism, thereby saving time and insuring proper operation.

Other objects and features of advantage will be noted in the following description of a preferred embodiment of this invention, but it is not limited to the specific apparatus shown herein, as various forms may be adopted within the scope of the appended claims.

In broad terms, the present invention comprises an airplane cockpit enclosure having one or more power-operated jettison rods adapted to butt against the enclosure to push it away from its support, after all latches have been released. Controls are preferably provided to permit sequential release of the latches and operation of the jettison rods, in the order named, by one control operation. In addition, means are provided to allow either fast or relatively very slow operation of the jettison rods.

This invention may be more fully understood by reference to the accompanying drawings, wherein:

Figure 3 is a cut-away perspective view of the same enclosure, showing in pictorial form a jettison system for lifting the enclosure a short distance above the airplane or for throwing it entirely clear of all parts of the airplane and its occupants.

Figure 5 is another cut-away perspective view of the previous enclosure, diagrammatically showing a control system for operating the latch release means of Figure 2 and the jettison system of Figure 3.

Figure 6 is a cut-away perspective view showing a control quadrant assembly taken from Figure 5 as indicated by the arrow 6.

Figure 1:
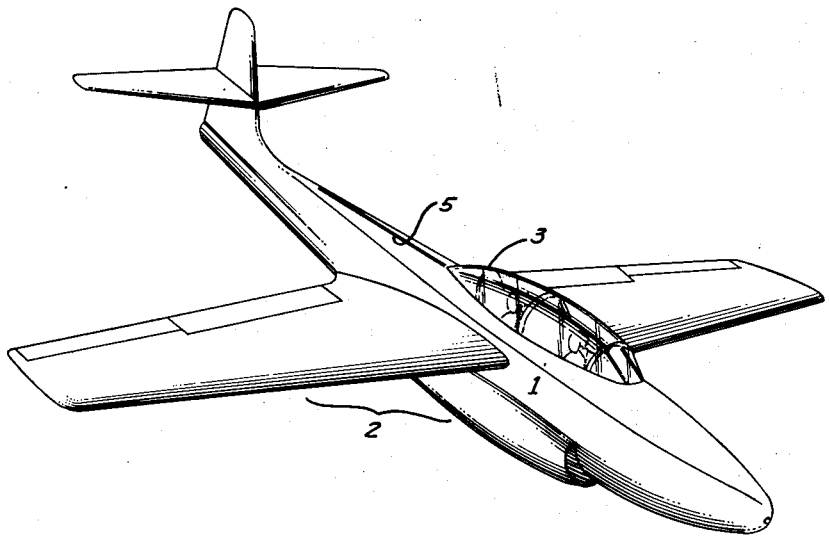
Figure 1 is a perspective view showing a two-place airplane incorporating a cockpit enclosure embodying the present invention.
Figure 2:
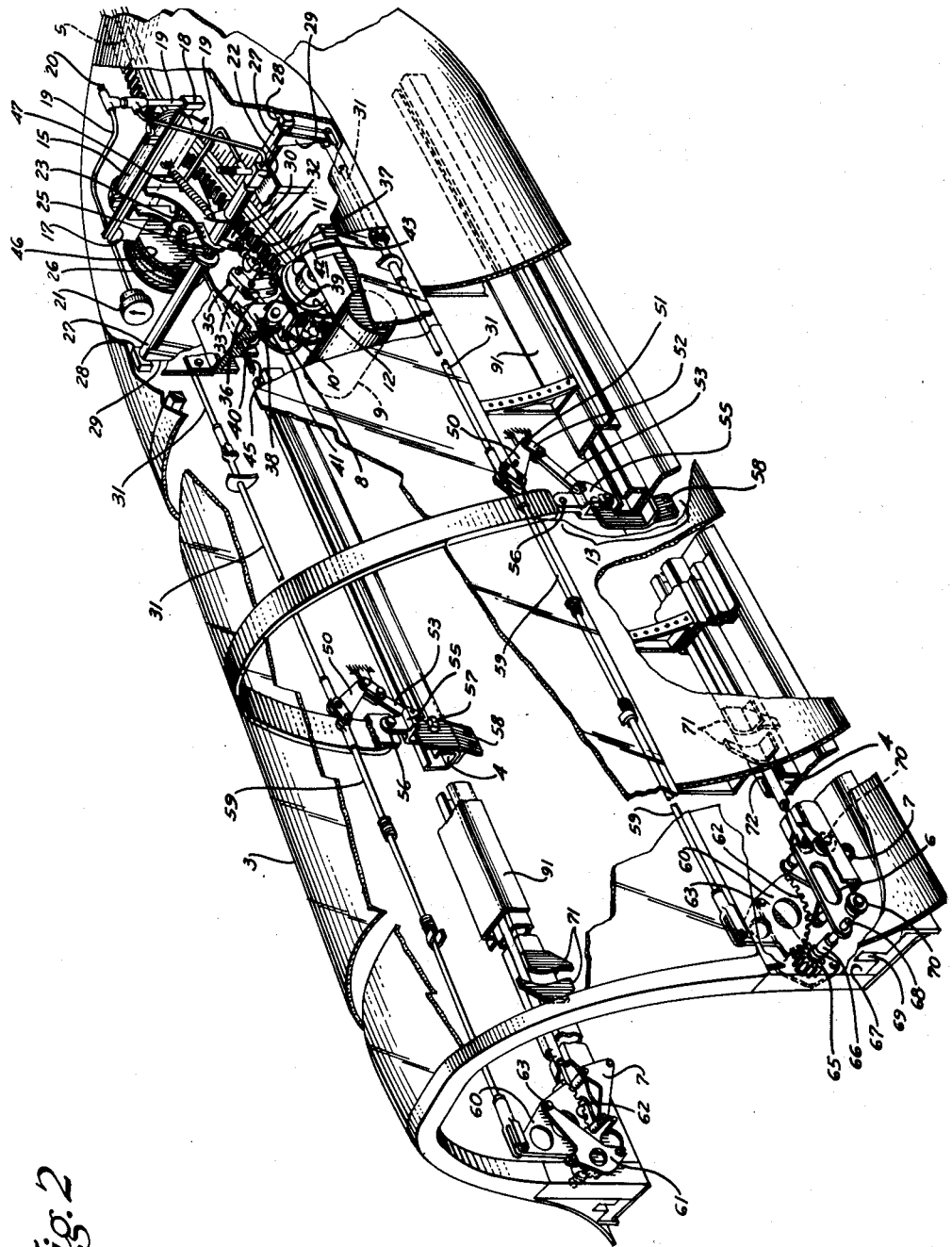
Figure 2 is a cut-away perspective view of the enclosure shown in Figure 1, showing its points of attachment to the airplane, and a means for unlocking such points.

Referring directly to Figures 1 and 2, the fuselage 1 of a two-place airplane 2 is provided with a sliding cockpit enclosure 3. The enclosure 3 operates in tracks formed by two side channels 4 forming a permanent part of the fuselage 1, and an I-beam 5 on the top center line of the fuselage 1.

Multiple-roller trucks are used at three points on the enclosure 3. Two forward trucks 6, which ride in the side channels 4, embody cam arms 7 which raise the forward end of the enclosure 3 as the enclosure is opened. An aft truck 8, which engages the I-beam 5, is driven by an electric motor 9 which is mounted on the enclosure 3. A center pinion 10 on the aft truck 8 engages a fixed rack 11 for the initial opening travel, about eleven inches, and the remainder of the travel is by a friction drive along the I-beam 5 through rubber-tired wheels 12 coaxially mounted with the center pinion 10. A side latch assembly 13 at the approximate mid-point of each side of the enclosure 3 aids in holding the enclosure firmly down against the fuselage structure when in the closed position.

The complete jettison operation comprises two independent, compressed nitrogen systems. The initial phase is actuated from a small nitrogen cylinder 15 which accomplishes the release of the five jettison points, namely, the two forward trucks 6, two side latches 13, and the aft truck 8. The second phase is actuated from a large nitrogen cylinder 16 (Figure 3) which raises the enclosure 3 to a definite position above the fuselage 1 when actuated from control means outside of the enclosure, or which throws the enclosure 3 clear of the airplane 2 when actuated from control means inside the enclosure.

The actuating sequence of the above-mentioned cylinders is controlled by a cable and quadrant mechanism to be described later. The latch releasing operation will be described first.

As shown in Figure 2, the enclosure 3 carries an aft section 17 behind the rear crew member's station, and in this aft section 17 are mounted the small nitrogen cylinder 15 and associated parts. Attached to a cylinder outlet 18 is tubing 19 connected to a filler valve 20, pressure gage 21, and latch control valve 22, the latter being spring-loaded in the closed position. Cylinder outlet 18 contains a self-opening valve, so that full cylinder pressure (1800 p. s. i.) is available to the pressure gage 21 and up to the latch control valve 22.

The normally-closed side of latch control valve 22 is connected by tubing to the fixed end of a latch piston assembly 23 containing the customary piston (not shown) and a piston rod 25 emerging from the forward end. The enclosed piston, and piston rod 25, normally rest in a retracted position. The forward end of piston rod 25 is rotatably connected to a torque tube drive arm 26 extending upwardly from a torque tube 27 which is mounted laterally and turns freely in end supports 28.

Torque tube 27 carries a driven lever arm 29 extending downwardly from each end, and a driven clevis arm 30 extending substantially downwardly from the approximate mid-point of the torque tube 27. Each driven lever arm 29 is pin-connected to a release rod 31 extending forwardly along the inside edge of the enclosure 3. The driven clevis arm 30 is pin-connected to an adjustable tension member 32 which, in turn, is pin-connected to the lower end of a link fitting 33.

Link fitting 33 is rotatably mounted at its upper end on a mounting pin 35, and is pin-connected near its forward side to a hook link 36 by a link pin 37. Hook link 36 extends forwardly to connect with an aft truck hook 38 at a hook pin 39. Aft truck hook 38 is pivotally hung on the enclosure aft section 17 from a hook pivot 40, and has its open side pointing toward the front of the enclosure 3. Hook pivot 40 is positioned above hook pin 39.

In the normal, un-jettisoned position, aft truck hook 38 fits around an engagement pin 41 which forms a solid drive connection between the aft truck 8 and enclosure 3. The electric motor 9 drives the aft truck 8 through a gear box 42 and drive coupling 43 connected to the wheels 12 and center pinion 10. Drive coupling 43 will drop out when the motor and gear box, fixed to the enclosure, are jettisoned, thus separating them from the aft truck 8 which remains with the airplane. Electrical power for the motor is furnished from an electrical cable 45 wrapped around a spring-loaded cable drum 46 at one end and attached by a disconnectable plug and socket to a bulkhead of the fuselage structure at the other end. The electrical cable 45 unwinds from the drum 46 as the enclosure 3 moves aft, and vice versa. No electrical operations are performed relative to the enclosure jettison system, electrical components being referred to merely to clarify the relation of the enclosure 3 to the electric motor 9 and aft truck 8.

As is now evident, the operation of the latch release system when the latch control valve 22 is opened, is to extend the piston rod 25, rotate the torque tube 27, and pull release rods 31 and tension member 32 aft. As tension member 32 moves aft, link fitting 33 rotates aft about mounting pin 35, and pulls hook link 36 aft, thus pulling aft truck hook 38 to the rear, out of locking engagement with engagement pin 41. The aft truck 8 is then severed from the enclosure 3 and its attached parts.

In the hooked position, tension member 32 is adjusted to place link pin 37 slightly above a straight line between mounting pin 35 and hook pin 39. A tension spring 47, acting between the aft section structure and the upper side of torque tube 27, keeps this linkage in its over-center position, so that rearward pressure on the aft truck hook 38 will not tend to rotate the torque tube 27 in the direction to release the various latches.

Each release rod 31 coming from the driven lever arms 29 is pin-connected to a latch plate 50 of the side latch assembly 13. The latch plate 50 is pivotally mounted on a plate pivot 51 and drives a latch arm 52 about the same plate pivot 51. Latch arm 52 connects through a latch link 53 to a fork 55 below a fork pivot 56 on the enclosure 3. The lower end of fork 55 mounts a kidney-shaped lug 57 which fits under a latch hook 58 attached to the fuselage 1. When hooked in this manner, the lug 57 and fork 55 hold the enclosure 3 firmly in place against vertical separation from the fuselage 1.

When the release rods 31 are pulled toward the rear by action of the latch piston assembly 23 as described above, latch plate 50 is rotated aft about plate pivot 51, rotating latch arm 52 upwardly to pull latch link 53 to the rear, which rotates fork 55 aft to disengage lug 57 from latch hook 58. The enclosure 3 is not now restrained by this side latch assembly 13. An over-center adjustment of latch link 53, similar to that at the aft truck installation, is provided to prevent any tendency of the latch mechanisms to creep open.

Proceeding forward from the side latch assembly 13, a tie rod 59, pin-connected to the latch plate 50 on each side of the enclosure near the release rod 31, is rotatably connected to the upper end of a gear quadrant 60 rearwardly pivoted on a bracket arm 61 fixed to the enclosure framework. The gear quadrant 60 has a row of gear teeth 62 cut in its forward lower edge, which extend in a circular arc about the quadrant pivot 63. The gear teeth 62 mesh with a pinion gear 65 which is internally threaded to mate with a threaded shaft 66. Pinion gear 65 is restrained from sideways motion, and the threaded shaft 66 is restrained from rotary motion, so that turning of the pinion gear 65 will give axial motion to the threaded shaft 66. A thread with a large lead is employed to give a relatively high ratio of shaft travel to pinion rotation. Threaded shaft 66 travels freely in a laterally extending bore through a fixture block 67 forming a part of the enclosure framework.

Threaded shaft 66 terminates at its outboard end with a release pin 68 which intersects and crosses a longitudinal groove 69 in the fixture block 67. The forward truck 6, upon which the enclosure rolls, extends upwardly into this groove 69, and the front end of the forward truck 6 is pivoted around the release pin 68. The release pin 68, therefore, forms the only connection of the forward truck 6 to the enclosure 3, although during the initial travel of the enclosure from the closed position, the upper side of groove 69 rests on the upper side of the forward truck 6 for substantially its entire length.

Forward truck 6 carries fore and aft rollers 70 which travel in the side channel 4 during normal opening and closing of the enclosure 3. Also shown in Figure 2 are cam plates 71 which engage the cam arms 7 on the forward trucks 6 to rotate the trucks upwardly about their rear rollers approximately 100 degrees after a short travel in the rearward direction. Cutouts 72 in the tops of the side channels 4 permit this upward movement. The enclosure 3 is thereby raised to continue its normal rearward travel on the rear rollers, only, of the forward trucks 6.

The direction of travel of threaded shaft 66 is such that as tie rod 59 moves to the rear, gear quadrant 60 rotates about quadrant pivot 63 and drives pinion gear 65 to displace threaded shaft 66 in the inboard direction to retract release pin 68 to the inboard side of groove 69 and out of engagement with the forward truck 6. Since this is the direction of operation caused by action of the latch piston assembly 23, as previously described, it is obvious that the enclosure 3 is thereby separated from the forward trucks 6 and is free to move upwardly.

This completes the description of the jettison attachment points of the enclosure 3. Rigging adjustments provided in release rods 31 and tie rods 59 permit simultaneous operation of the mechanisms at all five release points. However, the motions may be designed to actually release the aft, middle, and forward latches at slightly different amounts of rotation of the torque tube 27, if desired.

The jettison lifting operation performed by the large nitrogen cylinder 16, which is the second phase enumerated previously, will now be described. Referring to Figure 3, the components of this system are mounted in the cockpit, and thus remain in the airplane when the enclosure 3 is jettisoned. The large nitrogen cylinder 16 is mounted in a cylinder bracket 75 near the floor of the cockpit, and contains nitrogen gas at a pressure of 1800 p. s. i. It is provided with a cylinder cap 76 containing a self-opening valve similar to the one in the small nitrogen cylinder 15. From the outlet of this cylinder cap 76, a pressure line 77 communicates with a pressure gage 21a, a filler valve 20a, an externally-operated control valve 78, an internally-operated control valve 79, and an inlet port 80 of a pressure-actuated shut-off valve 81. These valves are all normally closed, so that full cylinder pressure exists only up to their inlet sides.

From the outlet side of the externally-operated control valve 78, a supply line 82 leads past a vent check 83, through a restrictor 85, and a check valve 86 to an actuating line 87. Vent check 83 is preferably provided to maintain atmospheric pressure in the supply line 82. This vent is designed to remain open to the atmosphere at normal line pressures and to close to the atmosphere when a pressure of approximately 45 p. s. i. occurs within the supply line 82, thus sealing the line to prevent escape of high pressure gas. The restrictor 85 is for the purpose of limiting the gas flow to a predetermined low rate.

The actuating line 87 comprises two branches, each of which leads to the lower end of a jettison cylinder 88. The jettison cylinder 88 is securely anchored to a support base 89 formed by part of the fuselage structure. This cylinder contains a piston (not shown) movable axially within the cylinder, as is well known in the art, and attached to a jettison rod 90. Jettison rod 90 extends just above the upper end of the jettison cylinder 88 when the enclosed piston is in the retracted position, as shown in Figure 3. Each side of the enclosure 3 carries a beam 91 along its lower edge. This beam 91 is in the shape of an inverted channel, and is positioned over the side channel 4 in which the forward truck 6 rides. A short distance forward of the center of gravity of the entire enclosure 3, an aperture 92 is provided in the bottom of each side channel 4, and the jettison rod 90 protrudes upwardly through this aperture 92. A bar 93 is fixed to the bottom center of each beam 91 and extends downwardly to the bottom inside of the side channel 4. This bar 93 is several inches in length and is positioned to cover the aperture 92 when the enclosure 3 is fully closed or anywhere from fully closed to approximately one foot open.

When the enclosure is in the closed position, jettison rod 90 almost contacts the lower edge of the bar 93. Thus it is seen that when the jettison rod 90 is extended it will contact the bar 93, and upon further extension, will raise the enclosure 3 the same amount on each side, providing the latches are released.

Operation of this part of the jettison lifting is then as follows: When the externally-operated control valve 78 is opened, the compressed nitrogen from the large nitrogen cylinder 16 will enter the supply line 82 and rapidly build up pressure at the restrictor 85. This will close the vent check 83, as previously stated, and gas will flow through the check valve 86, into the actuating line 87, at a rate definitely controlled by an orifice in the restrictor 85. Pressure thus continues to build up behind the piston in the jettison cylinder 88, and the jettison rods 90 will extend at a given rate, raising the enclosure 3. The stroke of the jettison rods 90 in this particular embodiment is nine inches; therefore, the enclosure will be raised approximately that amount. The enclosure is then merely resting on the jettison rods 90 at the front and on some portion of the fuselage 1 under the aft section 17, from which position it may be pushed over either side of the fuselage. All flow of nitrogen to the jettison cylinders 88 has been through the restrictor 85, thus fulfilling the requirement for a slowly operating system.

Figure 4:
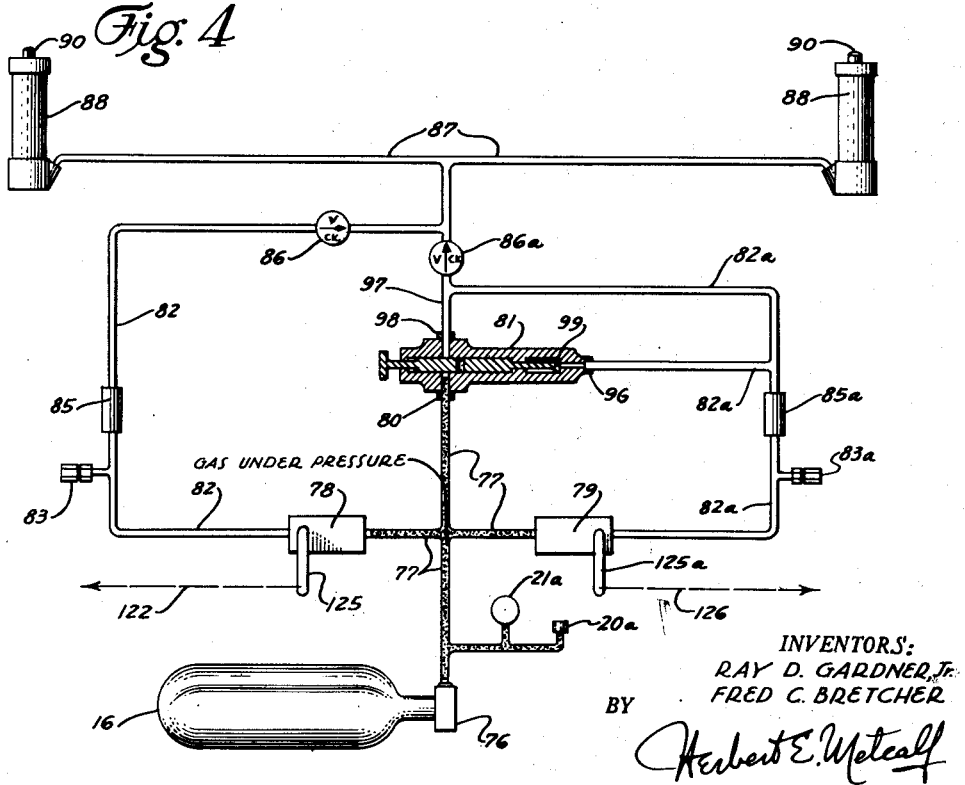
Figure 4 is a schematic diagram showing the working arrangement of the components of the system in Figure 3.

For the rapid jettison system, the internally-operated control valve 79 is used. As shown in Figures 3 and 4, the outlet side of this valve is connected by a supply line 82a to vent check 83a, a restrictor 85a, an actuating port 96 of the shut-off valve 81, a check valve 86a, and then to the actuating line 87. A valve outlet line 97 connects from an outlet port 98 of the shut-off valve 81 to the supply line 82a just before passing through the check valve 86a.

The vent check 83a and restrictor 85a are installed in this part of the system for the same basic functions as the equivalent parts in the slowly operating side. The shut-off valve 81 operates in the following manner.

When the internally-operated control valve 79 is opened, gas will flow through the restrictor 85a and check valve 86a to enter the jettison cylinders 88. Jettison rods 90 will extend slowly, under a relatively low pressure, until the bars 93 of the enclosure are encountered. Due to the weight of the enclosure (about 350 pounds), the jettison rods 90 will then stop until a pressure high enough to lift the enclosure occurs in the jettison cylinders 88. Pressure is therefore caused to increase in the supply line 82a, and consequently at the shut-off valve actuating port 96, due to the gas admitted through the restrictor 85a. This relatively slow initial action of the jettison rods is an important function of the system which will be referred to later.

When pressure at the actuating port 96 builds up to approximately 30 p. s. i., an internal piston 99 (Figure 4) is immediately displaced to open the inlet port 80 to the outlet port 98. Since full cylinder pressure (1800 p. s. i.) is available at the inlet port 80, unrestricted passage is then provided from the large nitrogen cylinder 16 directly through the shut-off valve 81 and check valve 86a to the jettison cylinders 88. The operation of the jettison rods 90 is then extremely fast, throwing the enclosure 3 more than fourteen feet into the air.

Since the jettison cylinders 88 are located just forward of the enclosure center of gravity, the front end will be raised faster than the aft end, allowing the passing airstream to act on the concave interior of the enclosure and carry it rapidly to the rear of the airplane 2.

During this jettison operation, nitrogen can not flow from supply line 82a to the supply line 82 on the slow side of the system, because of the check valve 86. The same thing applies when the slow operation is performed, i. e., the check valve 86a prevents entrance of nitrogen into inactive supply line 82a from the active supply line 82. These check valves permit unrestricted flow in the direction of the arrow thereon, but block all flow in the opposite direction, thereby preventing loss of nitrogen which otherwise would fill the inactive lines and probably escape through their vent check.

As stated previously, the bars 93 fixed to the enclosure beams 91 are positioned above the respective jettison rods 90 so as to be contacted by the jettison rods when the enclosure is fully closed or anywhere from fully closed to about one foot aft. This is to make possible the rapid jettison of the enclosure from any position within these limits. It will also be noted that as the enclosure starts to move aft along the tracks provided, the rear end will move upwardly as it follows the fixed gear rack 11. When approximately one foot open, the bars 93 will be lifted about 1½ inches above the jettison rods 90. Now if, at this position, the rapid jettison system would operate to release the compressed gas to the jettison rods through an unrestricted passage, the jettison rods would in all probability shoot upwardly through the above-mentioned 1½ inch space with such speed that the impact would tear holes in the enclosure beams 91, rather than jettisoning the entire enclosure properly. However, this action is precluded by the initial action of the jettison rods as described previously. Full gas flow is impossible until the jettison rods have actually met the bars 93 and caused sufficient back pressure to open the shut-off valve 81. Therefore, it is possible to jettison the enclosure safely from a partially open position as well as from the closed position. This feature makes the invention workable if the airplane is being flown with the enclosure slightly open, as may sometimes be done.

Thus it is seen that, depending upon which of the two control valves is operated, the enclosure can be jettisoned upwardly in a manner to positively clear the cockpit and tail structure of the airplane, or can merely be lifted to a predetermined position, as described before.

Figure 5 shows the control means for actuating the latch release control valve 22 and the jettison mechanism control valves 78 or 79 in the proper sequence. Here, a pilot's jettison handle 101 and a crew member's jettison handle 102 are located within the cockpit, and an external jettison handle 103 is located outside the enclosure 3, flush with the outer surface of the fuselage 1.

An external actuating cable 104 is connected between the external jettison handle 103 and one leg 105 of a control quadrant assembly 106. Handle cables 107 join the pilot's and crew member's handles 101 and 102 together to an internal actuating cable 108, in turn connected to another leg 105a of the control quadrant assembly 106.

Both the internal and external actuating cables 108 and 104 continue beyond the control quadrant assembly 106 and combine to form a latch valve operating cable 109. This cable enters the aft section 17 where it is connected to an actuator plate 110 which is slidably mounted on two screws 111 fixed to the fuselage structure. Actuator plate 110 has two straight slots 112 which can slide along the screws 111 and which are aligned in the same direction as the pull from the latch valve operating cable 109. The actuator plate 110 is spring-loaded in its rearward position.

A vertical edge 114 on the actuator plate 110 extends upwardly and is positioned just inboard of a latch valve lever 115 which is attached to the latch control valve 22 so that rotation of its lower end in the outboard direction will open the valve. Thus, sufficient tension in the latch valve operating cable 109 to overcome the spring force will move the actuator plate 110 forward and in the outboard direction to contact the lower end of latch valve lever 115 and rotate it to open the latch control valve 22.

This sliding contact method of operating the latch valve lever 115 is preferred because the latch control valve 22 is mounted on the enclosure 3 and will be separated from the airplane and the jettison control cables when the enclosure is jettisoned. A direct-connected cable for this purpose would not allow a complete separation.

As so far described, it is evident that when any of the three jettison handles 101, 102, or 103 is pulled, the latch valve lever 115 will be operated, with only a slight amount of slack in the system, due to the initial clearance between the actuator plate 110 and latch valve lever 115.

Returning to the control quadrant assembly 106, which is further shown in Figure 6, each leg 105 and 105a is respectively fixed to a slotted quadrant 116 and 116a. Each leg and its slotted quadrant are pivotally mounted on a common lateral axis pin 117 above the actuating cables 104 and 108. An arcuate slot 118 is provided near the lower side of each slotted quadrant 116 and 116a, the center of arc being at the axis pin 117. When either the internal or external actuating cable 108 or 104 is pulled back and forth, the respective slotted quadrant 116 or 116a is rotated about the axis pin 117, due to the rigid connection between each leg 105 or 105a and its respective slotted quadrant. Slotted quadrants 116 and 116a rotate independently, however, and movement of one does not cause movement of the other.

On the slotted quadrant 116, a cable yoke 119 is installed, its sides straddling the quadrant, and attached to the quadrant by means of a quadrant pin 120 through the arcuate slot 118 and into pin-receiving holes in the sides of the cable yoke 119 near the forward end, which is the open end. The rear end of cable yoke 119 forms a receptacle 121 for retaining the beaded end of an external valve cable 122 which is fed around an idler pulley 124 and connected to a valve actuating arm 125 on the externally-operated control valve 78.

The cables and quadrant are so rigged that in the normal position of the system (enclosure unjettisoned), the quadrant pin 120 lies at the forward end of the arcuate slot 118. When the external jettison handle 103 is pulled, thereby pulling forward on the external actuating cable 104, the latch valve operating cable 109 will be pulled and the slotted quadrant 116 will be rotated, but the external valve cable 122 will not be actuated at the same time, since the arcuate slot 118 will merely ride over the quadrant pin 120 without pulling it forward. As the external jettison handle 103 continues its travel, the slotted quadrant 116 will be rotated far enough forward so that the rear end of arcuate slot 118 will pick up the quadrant pin 120 and then exert a pull on the external valve cable 122. Motion of external valve cable 122 will then act on the valve actuating arm 125 to open the externally-operated control valve 78.

Arcuate slot 118 is long enough to permit the latch valve operating cable 109 to open the latch control valve 22 and completely release the latches, as described previously, before the externally-operated control valve 78 is opened. This assures latch release before operation of the jettison lifting system initiated by the operation of externally-operated control valve 78.

On the other slotted quadrant 116a, controlled by the internal actuating cable 108, a similar cable yoke 119a is provided, attached to an internal valve cable 126 which is similarly connected to another valve actuating arm 125a on the internally-operated control valve 79. Thus, when either the pilot's or crew member's jettison handle 101 or 102 is pulled, a sequence exactly like that described above will occur, except that the internally-operated control valve 79 will be opened instead of the externally-operated control valve 78 after release of the latches by means of the latch control valve 22. In any case, latch control valve 22 is always opened, because both the internal and external actuating cables 104 and 108 are connected directly to the latch valve operating cable 109 to the rear of the control quadrant assembly 106.

It will be noted from the foregoing description that the pilot's and crew member's jettison handles 101 and 102, which are accessible from inside the cockpit only, are connected to operate the enclosure jettison system through the pressure-actuated shut-off valve 81, while the external jettison handle 103, which is accessible from outside the cockpit only, is connected to operate the system through the restrictor 85 only.

Therefore, the rapid jettison operation is available during flight, and the slow, emergency lifting operation is automatically accomplished by personnel on the ground. Greater safety is thus provided than would be obtained by a single-speed system operable from either the inside or outside of the cockpit.

By locating the jettison rods 90 at pre-calculated points under the enclosure 3, the points of application of the jettison forces are definitely determined, and the action of the enclosure just after leaving the cockpit can be ascertained with a satisfactory degree of accuracy. The present invention, therefore, furnishes a much more reliable jettison operation than results from merely unlocking the enclosure latches and letting it escape however it may.

In the case of airplanes having pressurized cockpits, an internal force is always present tending to eject the enclosure. If the latches of such a pressurized enclosure are released, the internal pressure will, of course, blow the enclosure off, but its escape action may cause damage because of its unpredictable path of motion. This is largely due to the fact that the center of action of the internal force is not definitely known, or it may shift during the initial separation period and cause erratic results. Relying merely on the force produced by internal pressurization is thus not a satisfactory manner in which to jettison the enclosure, since this force is uncontrolled. In applying the present invention to a pressurized enclosure, it would be desirable to release this internal pressure by the normal dumping means usually incorporated in a pressurizing system before operating the jettison system. In order to simplify the operation and consume less time, with greater safety factor, the cockpit pressure dumping valves can easily be made to be operated by the enclosure jettison handles in conjunction with the system described herein.

It is also to be noted that, whereas nitrogen is employed in the specific apparatus of this specification, any other gas or mixture of gases would work equally well, such as carbon dioxide or air, for example. Also, the position, size, and number of jettison cylinders may be varied as desired, and the latches holding the enclosure in place may take any form, so long as they can be released to permit upward travel of the enclosure.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. An enclosure jettison system for an airplane comprising jettison latches normally securing said enclosure in place on said airplane, latch release means connected to release said latches to loose said enclosure from said airplane when said release means is actuated, an extensible member positioned adjacent to and separate from said enclosure, and adapted to make abutting contact with said enclosure when partially extended, power means connected to move said member to a fully extended position, when actuated, to force said enclosure away from said airplane when said latches are released, sequence control means connected to actuate, first, said latch release means and, second, said power means, and a single control element connected to operate said sequence control means as recited.

2. Apparatus in accordance with claim 1 wherein a piston is attached to said extensible member, and wherein said power means comprises means for holding a quantity of compressed gas adapted to produce pressure on said piston.

3. An enclosure jettison system for an airplane comprising an extensible member positioned adjacent to and separate from said enclosure, and adapted to make abutting contact with said enclosure when partially extended, a piston attached to said member, means for holding a supply of compressed gas, and means for directing said gas to produce pressure on said piston to extend said member in a direction to force said enclosure away from a normally closed position on said airplane, said extensible member having a fixed maximum extended position, and including a control valve having open and closed positions, connected to prevent application of pressure of said gas to said piston when closed and to admit said gas pressure to said piston when open, and restricting means to limit the rate of gas flow toward said piston to a predetermined value when said control valve is opened, said predetermined flow value being low enough so that, in the absence of forces on said enclosure other than those caused by contact of said member, said enclosure will remain resting on said airplane after said member has reached said maximum extended position, whereby said enclosure can be slowly and safely removed, in an emergency, when the airplane is on the ground.

4. An enclosure jettison system for an airplane, comprising an extensible member positioned to contact said enclosure, a piston attached to said member, means for holding a supply of compressed gas, means for directing said gas to produce pressure on said piston to extend said member in a direction to force said enclosure away from a normally closed position on said airplane, and including a control valve having open and closed positions, means connecting the inlet of said control valve with said compressed gas, a pressure-actuated shut-off valve having an outlet normally closed from an inlet and having an actuating port at which a predetermined pressure will open said outlet to said inlet, means connecting said inlet with said compressed gas, flow restricting means connected at its inlet with the outlet of said control valve, means connecting the outlet of said flow restricting means with said actuating port, means connecting the outlet of said flow restricting means with the extension side of said piston, and means connecting said shut-off valve outlet with the extension side of said piston, said predetermined pressure being substantially lower than the pressure of said gas supply and of such magnitude as to be attained at said actuating port after said extensible member has contacted said enclosure but before said enclosure has been moved by said member.

5. An enclosure jettison system for an airplane, comprising an extensible member positioned to contact said enclosure, a piston attached to said member, means for holding a supply of compressed gas, means for directing said gas to produce pressure on said piston to extend said member in a direction to force said enclosure away from a normally closed position on said airplane, and including a control valve having open and closed positions, means connecting the inlet of said control valve with said compressed gas, a pressure-actuated shut-off valve having an outlet normally closed from an inlet and having an actuating port at which a predetermined pressure will open said outlet to said inlet, means connecting said inlet with said compressed gas, flow restricting means connected at its inlet with the outlet of said control valve, means connecting the outlet of said flow restricting means with said actuating port, a check valve, means connecting the outlet of said flow restricting means with the inlet of said check valve, means connecting said shut-off valve outlet with the inlet of said check valve, means connecting the outlet of said check valve with the extension side of said piston, said predetermined pressure being substantially lower than the pressure of said gas supply and of such magnitude as to be attained at said actuating port after said extensible member has contacted said enclosure but before said enclosure has been moved by said member, a second control valve having open and closed positions, means connecting the inlet of said second control valve with said compressed gas, a second flow restricting means connected at its inlet with the outlet of said second control valve, and means connecting the outlet of said second flow restricting means with the extension side of said piston.

6. Apparatus in accordance with claim 1 wherein said power means comprises a piston attached to said extensible member, means for holding a supply of compressed gas, and a control valve, having open and closed positions, connected to prevent application of pressure of said gas to said piston when closed and to admit said gas pressure to said piston when open, and wherein said sequence control means is connected to open said control valve to actuate said power means.

7. Apparatus in accordance with claim 1 wherein said power means comprises a piston attached to said extensible member, means for holding a supply of compressed gas, and a control valve, having open and closed positions, connected to prevent application of pressure of said gas to said piston when closed and to admit said gas pressure to said piston when open, wherein said sequence control means is connected to open said control valve to actuate said power means, and wherein restricting means is connected between said control valve and said piston to limit the rate of gas flow toward said piston to a predetermined value when said control valve is opened, said predetermined flow value being low enough so that, in the absence of forces on said enclosure other than those caused by contact of said member, said enclosure will remain resting on said airplane after said jettison system has been operated.

8. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said power means comprises a piston attached to said extensible member, means for holding a supply of compressed gas, a control valve having open and closed positions, means connecting the inlet of said control valve with said compressed gas, a pressure-actuated shut-off valve having an outlet normally closed from an inlet and having an actuating port at which a predetermined pressure will open said outlet to said inlet, means connecting said inlet with said compressed gas, flow restricting means connected at its inlet with the outlet of said control valve, means connecting the outlet of said flow restricting means with said actuating port, means connecting the outlet of said flow restricting means with the extension side of said piston, and means connecting said shut-off valve outlet with the extension side of said piston, said predetermined pressure being substantially lower than the pressure of said gas supply and of such magnitude as to be attained at said actuating port after said extensible member has contacted said enclosure but before enclosure has been moved by said member, and wherein said sequence control means is connected to open said control valve to actuate said power means.

9. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said power means comprises a piston attached to said extensible member, means for holding a supply of compressed gas, a control valve having open and closed positions, means connecting the inlet of said control valve with said compressed gas, a pressure-actuated shut-off valve having an outlet normally closed from an inlet and having an actuating port at which a predetermined pressure will open said outlet to said inlet, means connecting said inlet with said compressed gas, flow restricting means connected at its inlet with the outlet of said control valve, means connecting the outlet of said flow restricting means with said actuating port, a check valve, means connecting the outlet of said flow restricting means with the inlet of said check valve, means connecting said shut-off valve outlet with the inlet of said check valve, means connecting the outlet of said check valve with the extension side of said piston, said predetermined pressure being substantially lower than the pressure of said gas supply and of such magnitude as to be attained at said actuating port after said extensible member has contacted said enclosure but before said enclosure has been moved by said member, a second control valve having open and closed positions, means connecting the inlet of said second control valve with said compressed gas, a second flow restricting means connected at its inlet with the outlet of said second control valve, and means connecting the outlet of said second flow restricting means with the extension side of said piston, wherein said sequence control means provides a first system actuating means connected to open first said control valve, whereby said power means is actuated at a rate substantially in accordance with its maximum power, and wherein said sequence control means also provides a second system actuating means connected to open said second control valve, whereby said power means is actuated at a relatively slow rate.

10. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said latch release means comprises means for holding a quantity of compressed gas, a control valve having open and closed positions, means connecting the inlet of said control valve with said compressed gas, a latch piston assembly having one end fixed relative to said latches, means connecting the outlet of said control valve with the fluid chamber of said latch piston assembly, and mechanical unlocking means connected between the other, movable, end of said piston assembly and said latches to release said latches when said control valve is opened, and wherein said sequence control means is connected to open said control valve to actuate said latch release means.

11. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said sequence control means comprises a pivoted member, means defining a slot in said pivoted member, said pivoted member having a positive driving relationship with said latch release means, and said slot-defining means having a delayed driving relationship with said power means.

12. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said power means provides two speeds, and wherein said sequence control means comprises two independently pivoted members, means defining a slot in each of said pivoted members, each of said pivoted members having a positive driving relationship with said latch release means, the slot-defining means in one of said pivoted members having a delayed driving relationship with said power means to actuate said power means in low speed, the slot-defining means in the other of said pivoted members having a delayed driving relationship with said power means to actuate said power means in high speed.

13. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said sequence control means comprises a pivoted quadrant, means defining a curved slot in said pivoted quadrant, said slot having its center of curvature near the pivot of said quadrant, a release cable pin-connected at one end to move with the rotation of said quadrant and connected at the other end to said latch release means to actuate said latch release means when pulled, a yoke pin-connected to slide in said slot, and a power cable connected at one end to said yoke and connected at the other end to said power means to actuate said power means when pulled, said sequence control means being so rigged that, when in a non-actuated position, said release cable contains substantially no slack, while said yoke is so positioned relative to said slot that said quadrant can be rotated to pull said release cable without pulling said power cable until said slot moves sufficiently far to positively engage said yoke by the slot end nearer said power cable to place tension in said power cable, whereby when said quadrant is so rotated, said latch release means will be completely actuated during the initial part of said rotation and said power means will be completely actuated during the latter part of said rotation.

14. An enclosure jettison system for an airplane, comprising jettison latches normally securing said enclosure in place on said airplane, latch release means connected to release said latches to loose said enclosure from said airplane when said release means is actuated, an extensible member positioned to contact said enclosure, power means connected to move said member to an extended position, when actuated, to force said enclosure away from said airplane when said latches are released, and sequency control means connected to actuate, first, said latch release means and, second, said power means, wherein said power means provides two speeds, and wherein said sequence control means comprises two independently pivoted quadrants, means defining a curved slot in each of said pivoted quadrants, each of said slots having its center of curvature near the pivot of its respective quadrant, a release cable assembly pin-connected at one end to move with the rotation of each of said quadrants and connected at the other end to said latch release means to actuate said latch release means when pulled by rotation of either of said quadrants, a yoke pin-connected in each of said slots to slide therein, a first power cable connected at one end to one of said yokes and connected at the other end to said power means to actuate said power means in low speed when pulled, and a second power cable connected at one end to the other of said yokes and connected at the other end to said power means to actuate said power means in high speed when pulled, said sequence control means being so rigged that, when in a non-actuated position, said release cable assembly contains substantially no slack, while each of said yokes is so positioned relative to its respective slot that its respective quadrant can be rotated to pull said release cable assembly without pulling its respective power cable until such slot moves sufficiently far to positively engage its respective yoke by the slot end nearer such power cable to place tension in such power cable, whereby, when one of said quadrants is so rotated, said latch release means will be completely actuated during the initial part of said rotation and said power means will be actuated in low speed or in high speed during the latter part of said rotation, the speed depending upon which one of said quadrants was so rotated.

15. An airplane cockpit enclosure jettison system comprising jettison latches normally securing said enclosure in place on said cockpit, latch release means connected to release said latches to loose said enclosure from said cockpit when said release means is actuated, a pair of extensible members positioned one under each side of said enclosure to contact said enclosure forward of the center of gravity thereof, power means connected to move said members simultaneously upwardly to an extended position, when actuated, to force said enclosure away from said cockpit when said latches are released, and sequence control means connected to actuate, first, said latch release means and, second, said power means.

16. In an airplane having a cockpit enclosure, fore and aft tracks along the sides of said cockpit, enclosure support means normally connected to said enclosure and adapted to ride in said tracks in vertical and lateral confinement, said enclosure support means including first disconnect means operable to allow upward movement of said enclosure free of said tracks, enclosure driving means having a driving connection between said enclosure and said cockpit to move said enclosure longitudinally of said airplane and normally mounted to travel with said enclosure, said enclosure driving means including second disconnect means operable to allow upward movement of said enclosure free of said driving connection, and release means connected to operate said first and second disconnect means substantially simultaneously at a closed position of said enclosure, whereby said enclosure can be completely removed from said airplane in a vertical path therefrom.

17. Apparatus in accordance with claim 16 wherein said release means is mounted on said enclosure, and wherein manual control means mounted in said cockpit is connected to make a separable contact with said release means to actuate said release means when said control means is operated.

18. In an airplane having a cockpit enclosure, fore and aft tracks along the sides of said cockpit, enclosure support means connected to said enclosure and adapted to ride in said tracks in vertical and lateral confinement, enclosure driving means having a driving connection between said enclosure and said cockpit to move said enclosure longitudinally of said airplane and mounted to travel with said enclosure, release means adapted to disconnect said support means and said driving means substantially simultaneously from said enclosure, whereby said enclosure may be completely disengaged from said airplane, and wherein said enclosure driving means comprises an electric motor-driven truck assembly having a driving gear, and a gear rack longitudinally mounted on said airplane to mesh with said gear, said truck assembly carrying a release fitting normally rigidly engaged by a pivoted hook on said enclosure and a releasable coupling between said driving gear and said motor, said motor being supplied with power from said airplane through a travelling disconnectable power cable assembly.

19. In an airplane having a cockpit enclosure, fore and aft tracks along the sides of said cockpit, enclosure support means connected to said enclosure and adapted to ride in said tracks in vertical and lateral confinement, enclosure driving means having a driving connection between said enclosure and said cockpit to move said enclosure longitudinally of said airplane and mounted to travel with said enclosure, release means adapted to disconnect said support means and said driving means substantially simultaneously from said enclosure, whereby said enclosure may be completely disengaged from said airplane, and wherein said enclosure support means is a roller-equipped truck assembly normally attached to said enclosure by a removable pin.

20. Apparatus in accordance with claim 16 including separate enclosure jettison means comprising an extensible member positioned under each side of said enclosure, and power means connected to extend said members simultaneously upwardly to contact said enclosure and force it away from said airplane after said release means is operated.

RAY D. GARDNER, Jr.
FRED C. BRETCHER.

REFERENCES CITED

The following references are of record in the file of this patent:

UNITED STATES PATENTS

| Number | Name | Date |
| --- | --- | --- |
| 2,125,752 | Saulnier | Aug. 2, 1938 |
| 2,361,113 | Lobelle | Oct. 24, 1944 |
| 2,479,713 | Beach | Aug. 23, 1949 |
| 2,482,004 | King | Sept. 13, 1949 |
| 2,493,904 | Ulrich et al. | Jan. 10, 1950 |